E. C. HORST.
GUARD FOR HOP PICKERS.
APPLICATION FILED MAY 5, 1910.
1,012,137.                                              Patented Dec. 19, 1911.
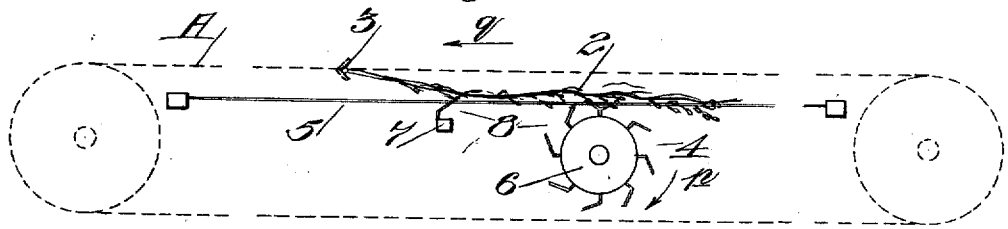
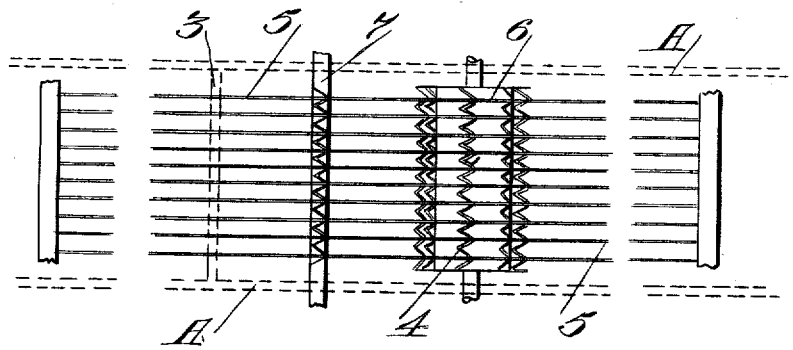

UNITED STATES PATENT OFFICE.

EMIL CLEMENS HORST, OF SAN FRANCISCO, CALIFORNIA.

GUARD FOR HOP-PICKERS.

1,012,137.  Specification of Letters Patent.  Patented Dec. 19, 1911.

Application filed May 5, 1910. Serial No. 559,616.

*To all whom it may concern:*

Be it known that I, EMIL CLEMENS HORST, citizen of the United States, residing in the city and county of San Francisco and State of California, have invented new and useful Improvements in Guards for Hop-Pickers, of which the following is a specification.

My invention relates to hop-picking machines, and machines of a kindred character.

The object of the present invention is to provide a simple, practical means for guarding the entering points of the picking devices, so that the hops or other fruit will not be broken or injured by forcible contact with any sharp points or projections.

The invention consists of the parts and the construction and combination of parts as hereinafter more fully described and claimed, having reference to the accompanying drawings, in which—

Figure 1 is a diagrammatic representation in side elevation of the invention. Fig. 2 is a plan view of the same.

A is an endless carrier of any suitable description to which the vines 2, carrying the hops or other fruit to be picked, are suitably attached by any appropriate means, represented at 3. The carrier A being operated at suitable speed by appropriate means, draws the vine 2 across the picking devices by which the hops or fruit are picked.

Arranged beneath and parallel with the carrier A and between the carrier and the picking devices 4 are a series of parallel guard wires 5 spaced apart just far enough to allow the hops on the traveling vines to drop through and be caught by the V-shaped pickers 4. These pickers 4 may be mounted either on a revolving drum, as 6, or be supported stationary, as shown at 7. In either case, these pickers are of suitable V-shape or serrated construction so as to present a V-opening to the approaching depending hops, in which opening the hops are caught in the crotch and pulled off from the vine; the apex of each V-opening being contiguous to two guard wires 5 and approximately midway between the wires. Where a revolving picking drum is used, the drum is made to revolve in the direction of the arrow *p*, or contrariwise to the direction of travel of the hop vine, which is represented by the arrow *q*.

The wires 5 constitute the important feature of the present invention, and they are disposed so that they stand immediately over the points or sides of the mouth of each V-opening of a picker 4, or, as before stated, approximately midway between the apexes of the V-openings; the object of these wires being to guard the points and open mouth of each V-opening and to direct the hops into the V-openings in an appropriate manner, so that the hops will be caught by the pickers and pulled from the vine without any unnecessary bruising. The wires 5 are, in the present instance, supported stationary and parallel with the carrier A, and the spaces between the wires are substantially open or unobstructed from end to end, the pickers working in between these spaces in the manner described.

The pickers have their apexes closed, and where made of wire their apex portions may project slightly up between the wires, so as to insure a perfect engagement of the hops in these openings; the wires themselves coming very close into the point portions formed by the juncture of the V-shaped part of the picker with the stem portions 8 by which the pickers are secured to their support.

One of the principal reasons for guarding the picking fingers is to keep the bulk of the vines and leaves off of the pickers, and to provide means for picking clean hops, with a minimum of clusters, and to prevent the dismembering of the vines which would take place if the ends of the serrated pickers were not guarded. Without guards there is nothing to prevent the catching of either the branches or main portion of a vine itself in the closed V of the picking member, which would result in a lot of unnecessary trash being picked or torn off with the hops. These broken portions of branches or vines would become waste and adhere to the picking members, thereby destroying their efficiency; besides, this trash would detract from the value of the picked product. By the use of the guards the vines are supported and only the protruding hops are caught and picked.

Having thus described my invention, what I claim and desire to secure by Letters Patent is—

1. In a hop-picking device, the combination of a series of parallel spaced guard wires between which the hops may depend, a carrier arranged to draw the vines over and in the length of the guard wires, the space between these guard wires being substantially open from end to end, and V-shaped pickers below and contiguous to the wires, with the outer edges of the V-openings of said pickers substantially in the plane of the wires, and the apex portions of said V-shaped pickers projecting up through said openings and slightly above the wires.

2. In a hop-picking machine, the combination of a series of stationary parallel guard wires in the same plane, a carrier moving in one direction over the wires, and a hop-picking device moving in an opposite direction underneath the wires.

3. In a hop-picking machine, the combination of a series of stationary parallel guard wires in the same plane, a carrier moving in one direction over the wires, and a hop-picking device moving in an opposite direction underneath the wires, said hop-picking device including a drum member having a series of V-shaped pickers, the apex portions of the pickers moving contiguous to and approximately midway between the guard wires.

In testimony whereof I have hereunto set my hand in the presence of two subscribing witnesses.

EMIL CLEMENS HORST.

Witnesses:
TheO. Eder,
Milton N. Miller.

Copies of this patent may be obtained for five cents each, by addressing the "Commissioner of Patents, Washington, D. C."